H. KORTUM.
PROTECTIVE FUEL VALVE FOR AUTOMOBILES.
APPLICATION FILED SEPT. 4, 1914.
1,125,123.
Patented Jan. 19, 1915.
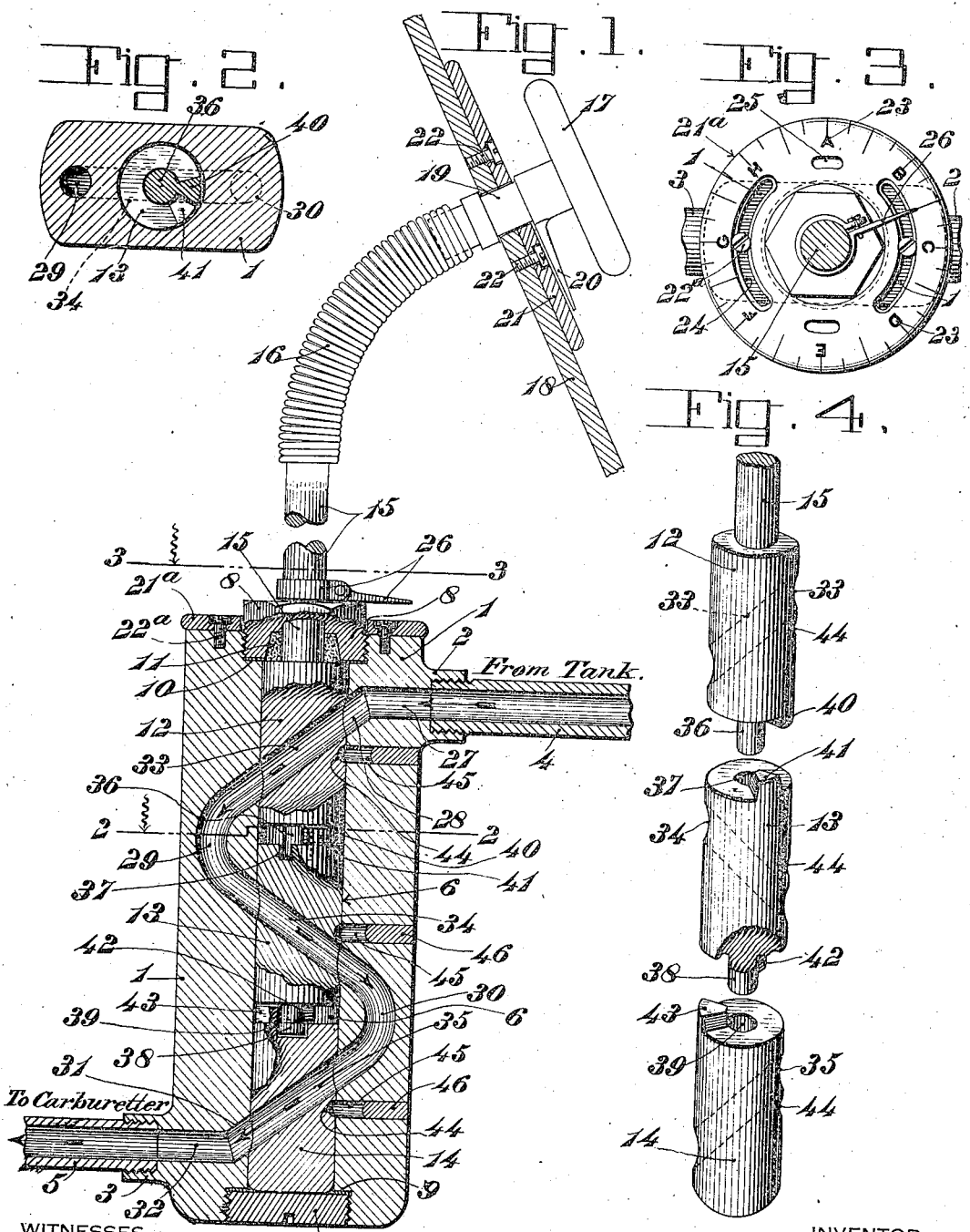
WITNESSES
INVENTOR
Henry Kortum
BY 
ATTORNEY

UNITED STATES PATENT OFFICE.

HENRY KORTUM, OF DAVENPORT, IOWA.

PROTECTIVE FUEL-VALVE FOR AUTOMOBILES.

1,125,123.
Specification of Letters Patent. Patented Jan. 19, 1915.
Application filed September 4, 1914. Serial No. 860,268.

*To all whom it may concern:*

Be it known that I, HENRY KORTUM, a citizen of the United States, residing at Davenport, in the county of Scott and State of Iowa, have invented a new and useful Protective Fuel-Valve for Automobiles, of which the following is a specification.

This invention has reference to protective fuel valves for automobiles, and its object is to provide a means which may, if desired, be readily controllable from the instrument board at the dash of an automobile, whereby the fuel supply may be cut off when the automobile is left unattended, to thereby prevent unauthorized use of the vehicle.

In accordance with the present invention there is provided a valve structure adapted to be included in the duct or pipe connecting the fuel tank of the automobile with the carbureter, and this valve is of a character such that it may be termed a permutation valve requiring it to be manipulated in certain directions and to certain extents in the same manner as is required for the proper manipulation of permutation locks. The valve comprises a suitable casing with a series of interconnected valve plug sections with ducts therethrough coacting with ducts in the casing in such manner that the inlet and outlet ends of the casing are only brought into conjunction when the valve plug sections have been moved into certain prearranged relation. By making the valve plug of two or three or more sections in alinement, with each section controlling the next section in order, and each section having a duct or passage therethrough movable into coincidence with corresponding ducts or passages in the valve casing, the several valve plug sections may be moved together and separately to bring them all into coincidence with the casing passages, so that at the completion of a proper series of movements the valve is open, but may be readily closed by a movement of the valve plug or a section thereof in either direction. To any one knowing the proper combination the valve is readily opened, but to one ignorant of the combination the valve is permanently closed. By the aid of a manipulating member and suitable dial on the instrument board of the dash of the vehicle or at any other convenient point, the operator has control of the gasolene valve, and knowing the combination may readily open it, in which condition it will remain so long as the operator desires. When, however, the vehicle is to be left unattended, a simple turn of the manipulating member will close the valve against any probability of the valve being again opened except by one familiar with the proper combination, which combination, of course, need not be imparted to any one not authorized to operate the vehicle. Provision is made for a change in the combination without any change in the structure of the device, so that the owner of the vehicle may change the combination at any time, in which event any unauthorized person having gained knowledge of the combination will no longer be able to open the valve.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a longitudinal section of the improved safety valve showing a connection therefrom to the instrument board of the automobile. Fig. 2 is a section on the line 2—2 of Fig. 1, some distant parts being omitted. Fig. 3 is a section on the line 3—3 of Fig. 1. Fig. 4 is a perspective view of the valve plug with the parts separated axially and with some parts broken away to better disclose the structure.

Referring to the drawings, there is shown a valve casing 1 which in the particular showing is in the form of an elongated block wider than thick, and having the long edges somewhat rounded, but the particular shape of the casing 1 is not at all obligatory, since the valve casing may be of various shapes without affecting the workings of the invention. At respectively opposite ends of the opposite edges of the valve casing, nipples 2, 3 are formed, these nipples being internally threaded for the reception of respective pipes 4, 5, the pipe 4 being considered as leading from the gasolene tank to the valve and the pipe 5 being considered as leading from the valve to the carbureter, but as both the tank and carbureter are present in nearly all automobiles it is deemed unnecessary to illustrate them.

Extending axially through the valve casing is a bore 6 which may be of equal diameter throughout, although this is not obligatory, while at the ends of the bore are counterbores, one receiving a plug 7 and the other a packing gland 8. The plug 7 is threaded into the corresponding counterbore and may confine a packing ring 9 therein, while the gland 8 is threaded into the respective counterbore and confines a packing ring 10 and packing material 11, the latter being contained in a suitable cavity formed in the corresponding face of the gland 8. Between the plug 7 and gland 8 there is lodged in the bore 6 a valve plug comprising in the particular showing of the drawings three cylindrical blocks 12, 13, 14, respectively, but it will be understood that the invention is not confined to a multi-sectional valve of three sections, since under some circumstances two sections might answer and for other purposes it might be desirable to use four or more sections.

The valve section 12 is formed at one end with an axial stem 15 projecting through the gland 8 and engaged by the packing 11. The stem 15 may be as long as desired and may extend to any length necessary beyond the corresponding end of the valve. Where the stem 15 cannot follow a straight line to the manipulating end it has one end of a flexible shaft 16 connected to it, and the other end of this shaft carries a manipulating member 17 which may be in the form of a wheel, or have any other suitable shape. In the particular showing of the drawings the manipulating member 17 is mounted in a board 18 which may be considered as the instrument board usually supplied at the dash portion of the automobile. The manipulating member 17 is shown as formed with a stem 19 extending through the board 18 and there attached to the corresponding end of the shaft 16. The stem 19 outside of the board 18 is provided with a pointer 20 movable over a dial 21 held in position by screws 22 or otherwise. A similar dial 21ª may be secured to that end of the valve body or casing 1 through which the stem 15 projects, and this dial 21ª is held by screws 22ª to the valve casing. A plan view of the dial 21ª is shown in Fig. 3 from which it appears that there are indicia 23 about the marginal portion of the dial, which, as is customary, is circular, while arc-shaped slots 24 are formed through the dial plate on opposite sides of the center thereof, and these slots are traversed by the screws 22ª, so that the dial may be turned upon its center through arcs of considerable extent. At other points on opposite sides of the center of the dial are passages 25 provided for the reception of a spanner permitting the adjustment of the dial as desired. Gripped about the stem 15 and made fast thereto is a pointer or finger 26 adapted to the dial 21ª. The dial 21 is assumed to be of similar structure and capable of similar adjustment to the dial 21ª and the fingers 20 and 26 have similar functions.

The pipe 4 opens into a duct 27 in turn opening into the bore 6 of the valve casing near one end thereof, the duct 27 where opening into the bore 6 having an angle bend 28. On the other side of the bore from the duct 27 is a return duct 29 having one end in line with the angle bend 28 and extending lengthwise of the bore 6 a distance to straddle the junction between the blocks 12 and 13 of the valve plug. Straddling the junction of the blocks 13 and 14 of the valve plug and located in the body of the valve on the same side as the duct 27, but opposite to the duct 29, is another return duct 30 having one end in line with the corresponding end of the duct 29 and the other end in line with an angle portion 31 of a duct 32 on the same side of the body 1 as the duct 29 and corresponding to the duct 27 with its angle extension 28. The duct 32 opens into the pipe 5.

Extending diagonally through the block 12 is a duct 33, and extending similarly through the blocks 13 and 14 are respective diagonal ducts 34 and 35. The angles of the ducts 33, 34 and 35 are such that they may be brought into coincidence with the respective ducts in the body member. The duct 33 is so located that upon rotation of the block 12 to the proper position those portions of the ducts 27 and 29 opening into the bore 6 within the range of the block 12 are joined, and when the blocks 13 and 14 are properly positioned the ducts 34 and 35 through them join the ducts 29 and 30 and 30 and 32, respectively.

The block 12 has at the end remote from the stem 15 an axial spindle 36 and the corresponding end of the block 13 is provided with a socket 37 adapted to receive the spindle 36. That end of the block 13 remote from the socket 37 is provided with an axial spindle 38 and the block 14 at the corresponding end is formed with an axial socket 39 adapted to receive the spindle 38.

The matching ends of the blocks 12 and 13 are formed with respective lugs 40 and 41 extending from the ends of the blocks in the direction parallel with the longitudinal axis of the blocks and also radial to the axis of rotation of the blocks. The matching ends of the blocks 13 and 14 are provided with similar lugs 42 and 43, respectively. When the valve plug is assembled with the spindle 36 and 38 in the sockets 37 and 39, the lugs 40 and 41 engage the respective faces of the blocks 12 and 13, and the lugs 42 and 43 engage the respective end faces of the blocks 13 and 14. When any one of the blocks is turned sufficiently its lugs engage the lugs of the other blocks, and on a continued turning the engaged blocks are also turned.

Suppose, by way of example, that the valve is close, which happens whenever a duct through any one of the blocks is out of communication with matching ducts in the body of the valve. In the particular arrangement shown in Fig. 1 the valve is in the open position. If any one of the blocks be displaced sufficiently to carry the duct through the block out of communication with any one of the companion ducts, the valve becomes closed. Let it be supposed that this has occurred, and that it is the desire of the operator to again open the valve. First the manipulating handle of the valve plug is rotated to the right a number of times, say, three or more times, stopping at a point intermediately between A and B on the dial of Fig. 3. This will bring block 14 so that its duct 35 is in communication with the ducts 30 and 32, the block retaining its position frictionally. Now, the handle is rotated in the reverse direction; that is, toward the left, for one complete turn, and the movement is continued until the pointer is midway between E and F. This brings block 13 into position so that its duct 34 is in line with the ducts 29 and 30, block 14 in the meantime remaining quiescent. Finally, the manipulating member is turned again to the right until the pointer is midway between B and C of the dial, this movement bringing block 12 into position, so that its duct 33 is in line with the ducts 27 and 29, in which position the valve is open and the pipes 4 and 5 are in free communication.

If the valve plug consists of more than three associated blocks, then the setting of the valve to the open position becomes more complicated. If it consists of but two blocks, the setting of the valve is correspondingly simplified. The arrangement is a permutation arrangement, whereby the displacement of any one of the blocks from the open position causes the closing of the valve, and if the operator is careful to turn the manipulating member 17 through a considerable range of movement the blocks are so displaced with relation one to the other from the open position that no amount of manipulation is liable to again set the valve in the open position, especially when such manipulation is attempted by one unfamiliar with the combination, but the setting of the valve is a very simple matter and very quickly performed by one knowing the combination.

For the initial setting of the valve plug sections in the open position, or in case of loss of the combination, the finding of it, each block 12, 13 and 14 is provided at a proper point with a notch 44, while the valve casing 1 has holes 45 bored therethrough in proper position with respect to the notches 44. By the aid of a suitable pin introduced into the passage corresponding to the block 14, the proper position of the latter is readily found and then by reversing the direction of rotation of the manipulating member and with the aid of a pin introduced into the passage 45, the proper position of the block 13 is ascertained. Similarly the proper position of the block 12 is found, the operator taking note of the various movements and indications of the pointer on the dial while finding these proper positions, whereby the combination is ascertained. To prevent any unauthorized person from similarly finding the combination, the holes 45 are each closed by a plug 46 after the combination is found.

The combination so far as the dial is concerned may be changed at any time by loosening the screws 22 or 22ª and rotating the dial for a limited distance, this not changing the direction or extent of rotation of the manipulating member, but the stopping points, while actually the same, are differently indicated on the dial, and one familiar with the combination before the dial is reset would be unable to open the valve with the dial reset without knowing the new dial positions. After the proper combination has been ascertained the dial 21ª and pointer 26 may be dispensed with or they may remain in position indefinitely.

The improved valve is protective of the vehicle since it provides a means for cutting off the supply of gasolene from the carbureter, so that even if the machine be started it will quickly come to rest because of the exhaustion of the small amount of fuel available and unless the operator of the machine be familiar with the combination it is practically impossible to again connect up the gasolene tank with the carbureter.

What is claimed is:—

1. A permutation valve for insertion in the line of communication between the gasolene tank and carbureter of an automobile, comprising a casing with an inlet and an outlet at spaced points, and with intermediate duct sections, and a sectional plug provided with ducts and permutation connections between the plug sections for connecting the inlet and outlet and intermediate duct sections together, and a single manipulating means for the plug.

2. A permutation valve for insertion in the line of communication between the gasolene tank and carbureter of an automobile, comprising an elongated casing with a single bore and with an inlet to the casing communicating with the bore near one end thereof, and an outlet communicating with the bore near the other end thereof, and said casing having intermediate duct sections communicating with the bore at points between the inlet and outlet, and a multiple plug made up of blocks one more in number than the intermediate duct sections of the valve with each block having a lost motion connection with the next in order for turning and also with a passage therethrough for connecting the duct sections through the casing, and means for turning the plug sections in opposite directions in accordance with a predetermined combination.

3. A permutation valve for insertion in the line of communication between the gasolene tank and carbureter of an automobile, comprising a casing with a sectional plug with passages through the sections and other passages through the body of the valve, and a single manipulating means for moving the plug sections to bring the passages therein in harmony with the passages through the casing.

4. A permutation valve for insertion in the line of communication between the gasolene tank and carbureter of an automobile, comprising a casing and a series of plug sections in axial relation and having lost motion connections, the casing and plug sections being also provided with coactively related passages or ducts, and means for moving the plug sections in accordance with a predetermined combination to bring the passages in harmony.

5. A permutation valve for insertion in the line of communication between the gasolene tank and carbureter of an automobile, comprising a casing with a sectional permutation valve plug having the sections in axial alinement, a single manipulating means for the plug, and a dial in coactive relation to the manipulating means, said dial being mounted for movement to different positions for changing the reading of the combination.

6. A permutation valve for insertion in the line of communication between the gasolene tank and carbureter of an automobile, comprising a valve casing and a permutation plug composed of an axially arranged series of interconnected sections, a single manipulating means for the plug, and a dial associated with the manipulating means and movable to different positions about the axis of the manipulating means, said dial comprising a plate with arc-shaped slots therein struck from the axis of rotation of the manipulating means, and fastening devices for holding the dial in place, said fastening devices extending through the slots.

7. A permutation valve for insertion in the line of communication between the gasolene tank and carbureter of an automobile, comprising an elongated valve casing with a longitudinal bore therethrough, and ducts communicating at different points with the bore, closure members for the ends of the bore, a multiple valve plug lodged in the bore and comprising an alined series of blocks, each with a passage therethrough movable into coincidence with corresponding ones of the passages or ducts in the casing, each block being provided at one side of its longitudinal axis with a lug adapted to engage a corresponding lug in the adjacent block, and means for rotating the blocks about the longitudinal axis of the plug to bring all the ducts or passages through the valve into harmony.

8. A permutation valve for insertion in the line of communication between the gasolene tank and carbureter of an automobile, comprising an elongated valve casing with a longitudinal bore therethrough and ducts communicating at different points with the bore, closure members for the ends of the bore, a multiple valve plug lodged in the bore and comprising an alined series of blocks each with a passage therethrough movable into coincidence with corresponding ones of the passages or ducts in the casing, each block being provided at one side of its longitudinal axis with a lug adapted to engage a corresponding lug on the adjacent block, and means for rotating the blocks about the longitudinal axis of the plug to bring all the ducts or passages through the valve into harmony, each block of the plug being provided with a notch and the body of the valve having passages extending from the exterior thereof to the bore and the passages and notches being located with reference to each other to be in coincidence when the ducts through the blocks are in harmony with the ducts in the valve casing.

9. A permutation valve for insertion in the line of communication between the gasolene tank and carbureter of an automobile, comprising an elongated casing having a longitudinal bore therethrough with inlet and outlet ducts communicating with the bore near opposite ends thereof and with intermediate return ducts communicating at spaced points with the bore on opposite sides thereof, and a valve plug seated in the bore and comprising a plurality of blocks in alinement, each block having a diagonal duct therethrough movable into harmony with corresponding ducts in the valve casing and with the matching ends of the blocks provided with lugs projecting from the said ends of the blocks lengthwise of the blocks and of restricted circumferential area to permit rotation of each block in either direction for a distance less than a full turn without causing participation of the next block in order in such movement.

10. A valve provided with a sectional valve plug comprising interconnected sections in permutational relation, and means for moving the plug sections in accordance with a predetermined combination to bring the valve to the open condition.

11. A valve provided with a sectional valve plug and a single means for the actuation of the plug, the sections of the valve plug being permutationally connected.

In testimony, that I claim the foregoing as my own, I have hereto affixed my signature in the presence of two witnesses.

HENRY KORTUM.

Witnesses:
  A. J. GOETTIG,
  E. MUKLEY.